Aug. 25, 1959 H. SCHMID ET AL 2,901,643
REMOTE CONTROL RECEIVER FOR CENTRAL REMOTE CONTROL
INSTALLATIONS UTILIZING AUDIO-FREQUENCY SIGNALS
SUPERIMPOSED ON THE MAINS NETWORK
Filed June 20, 1957 2 Sheets-Sheet 1

INVENTORS
HANS SCHMID
HANS HURLIMANN
BY
Morgan, Finnegan, Durham & Pine
ATTORNEYS INVENTORS
HANS SCHMID
HANS HURLIMANN
BY
Morgan, Finnegan, Durham & Pine
ATTORNEYS.

United States Patent Office 2,901,643

Patented Aug. 25, 1959

2,901,643

REMOTE CONTROL RECEIVER FOR CENTRAL REMOTE CONTROL INSTALLATIONS UTILIZING AUDIO-FREQUENCY SIGNALS SUPERIMPOSED ON THE MAINS NETWORK

Hans Schmid, Zurich, and Hans Hürlimann, Baar, Zug, Switzerland, assignors to Landis & Gyr A.G., Zug, Switzerland, a body corporate of Switzerland Application June 20, 1957, Serial No. 666,875

Claims priority, application Switzerland June 23, 1956

6 Claims. (Cl. 307—140)

The present invention relates to a novel and improved synchronous selector remote control receiver to be actuated by audio-frequency signals superimposed on a mains network and received from a central remote control installation.

Objects and advantages of the invention will be set forth in part hereinafter and in part will be obvious herefrom, or may be learned by practice with the invention, the same being realized and attained by means of the parts, constructions, arrangements and combinations pointed out in the appended claims.

The invention consists in the novel parts, constructions, arrangements, combinations and improvements herein shown and described.

The accompanying drawings, referred to herein and constituting a part hereof illustrate several embodiments of the invention, and together with the description, serve to explain the principles of the invention.

As is known, central remote control installations, also called broadcast control installations, serve to enable switching orders to be sent from a control station through an electrical energy distribution network to all load points of the network, either for changing over tariffs of meters, or for switching on and off loads, for example boilers, furnaces, street lighting and the like, or again for controlling switches.

For this purpose, audio-frequency impulses are transmitted to the network from a transmitter at the control station, and the stations to be controlled comprise receivers which respond to predetermined signals and carry out the required switching function. The most common of the various known central remote control systems are based upon a time interval method. In this method, a series of order impulses follow a starter impulse on the time axis. These order impulses are generally produced by a synchronous selector acting as a transmitter, which operates in known manner on the energy transmission network to be controlled, through an audio-frequency transmitting installation. The receivers are generally selectors which rotate synchronously with the network frequency and whose selecting contacts correspond to the contacts of the synchronous transmitter.

Receiving arrangements of the aforesaid type often comprise very sensitive receiving relays, which can accordingly be operated by the interference voltages present in the network. Protection is generally afforded against continuous interference voltages by choosing a response voltage which is higher than the possible continuous level. For protection against brief, but relatively intense interference impulses, various steps have been proposed, some of which have been carried into practice. Thus, for example, it has already been proposed to provide in the remote control receivers a delay arrangement for the transmission of order impulses, which acts in such manner that interference impulses which are shorter than the order impulses cannot operate the receiving arrangement, or to provide in the synchronous selector, for preventing it from being automatically started by brief interference impulses, a resetting device which always resets the selector to the zero position when the duration of the impulses is not of a predetermined magnitude. It is then desirable to make the starter impulse longer than the order impulses and to make the aforesaid resetting value greater than the length of an order impulse. Protection is thereby afforded against self-starting, not only by brief interference impulses, but also by order impulses.

The present invention has for an object the provision of a novel and improved synchronous selector remote control receiver which is simple in construction and reliable in operation and which is adapted to be actuated by audio-frequency signals superimposed on a mains network and received from a central remote control receiver which is safeguarded against erroneous operation such as might be caused by interference voltages present in the network.

The present invention is therefore concerned with a concrete construction of the aforesaid resetting device, and provides a remote control receiver for central remote control installations, utilizing audio-frequency signals superimposed on the mains network, also called broadcast control installations, which operates in accordance with the synchronous selector principle, that is to say, in which order impulses in timed relation with a starter impulse are processed by means of a synchronous selector, in which a shaft driven by a synchronous motor actuates on the one hand a contact arrangement lying in the circuit of the synchronous motor driving the said shaft, and associated with the starting pulse, and on the other hand at least one contact arrangement allocated to the order impulses, and in which the synchronous selector is provided with a resetting device such that the synchronous selector is returned into the zero position on deflection from this position by impulses which do not exceed a predetermined length which is shorter than the starter impulse, characterized in that the resetting device consists of a resetting member acting on the synchronous shaft, on which resetting member a resetting spring acts through a resetting lever member, and of a retaining member acting on the synchronous shaft, on which retaining member a retaining spring acts through a retaining lever member.

It will be understood that the foregoing general description and the following detailed description as well are exemplary and explanatory of the invention but are not restrictive thereof.

Embodiments of the invention will now be described by way of example with reference to the accompany drawings, in which.

Figure 1:
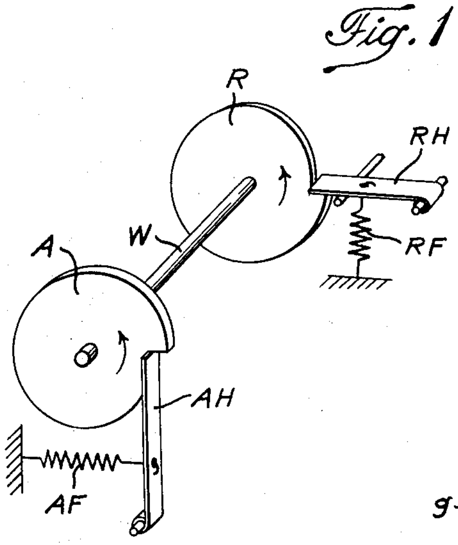
Figure 1 is a diagrammatic perspective view of one form of construction of mechanism according to the invention.

Figure 1 shows a constructional example of the subject of the invention, in which the resetting member R is a cam disc mounted on a synchronous shaft W and secured against rotation in the counter-clockwise direction by a leaf spring acting as a resetting lever member RH with the aid of the resetting spring RF. The retaining member A is also a cam disc mounted on a synchronous shaft W, which cam disc is secured against rotation from the zero position in the clockwise direction by a leaf spring acting as a retaining lever member AH with the aid of a retaining spring AF. Figure 1 shows that a predetermined deflection of the synchronous selector from the zero position is necessary before it can complete its movement. If this deflection is not effected due to the impulses being of insufficient length, the synchronous selector is turned back into the zero position by the resetting lever member RH with the aid of the resetting spring RF.

Figure 2:
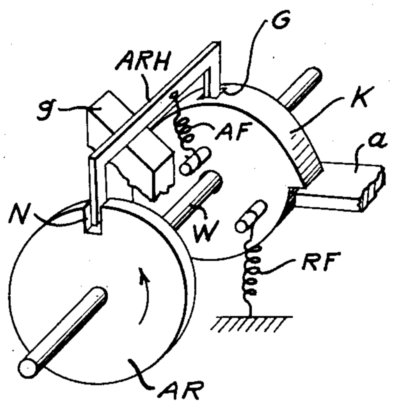
Figures 2 and 3 are similar views of two modified forms of construction.

Figure 2 shows a constructional example of the subject of the invention in which, on the one hand, the resetting member and the retaining member are combined to form a common retaining and resetting member AR and the retaining lever member and the resetting lever member on the other hand are combined to form a common retaining and resetting lever member ARH, the latter being so coupled with a coupling member K freely rotatable with respect to a stop *a* that the retaining and resetting lever member ARH can carry out both a rotational movement corresponding to the effective range of the resetting spring RF and a sliding movement corresponding to the effective range of the retaining spring AF. The arrangement operates as follows:

On deflection of the synchronous selector in the counter-clockwise direction, the retaining and resetting member AR designed as a disc and fixedly mounted on the synchronous shaft W is also rotated and transmits this rotational movement through the retaining and resetting lever member ARH and to the coupling member K designed as a cam disc and loosely mounted on the synchronous shaft W, against the action of the resetting spring RF. In this rotational movement, the retaining and resetting lever member ARH is pushed out of a slot N in the retaining and resetting member AR against the action of the retaining spring AF with a sliding movement on a sliding surface *g*. During this movement, the retaining and resetting lever member ARH is guided by a guide slot in the coupling member K. If the deflection of the synchronous selector in the counter-clockwise direction is sufficient, the said selector completes its movement. When the deflection does not attain this value, the synchronous selector is retracted, as will be apparent, against the stop *a* into the zero position.

Figure 3:
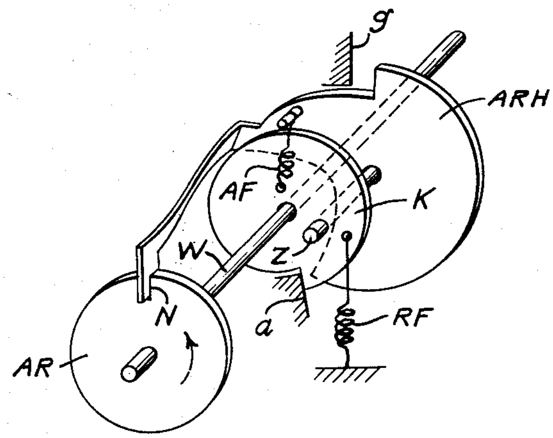

Figure 3 shows a further constructional example of the subject of the invention, which operates similarly to that of Figure 2, and in which the retaining and resetting lever member ARH is moved relative to the coupling member K, but with a rotational movement by means of a pivot pin and not with a translational movement. The arrangement operates similarly to that described with reference to Figure 2. On deflection in the counter-clockwise direction, the coupling member K loosely mounted on the synchronous shaft W is first driven against the action of the resetting spring RF through the retaining and resetting lever member ARH. If the deflection is sufficient, the retaining and resetting lever member ARH is thus lifted out of the slot N, whereafter the synchronous selector can complete a whole revolution until the arrangement is again held fast in the zero position by engagement of the retaining and resetting lever member ARH in the slot N. If the deflection in the counter-clockwise direction does not attain a particular magnitude, the synchronous selector is retracted into the zero position against the stop *a*.

Figure 4:
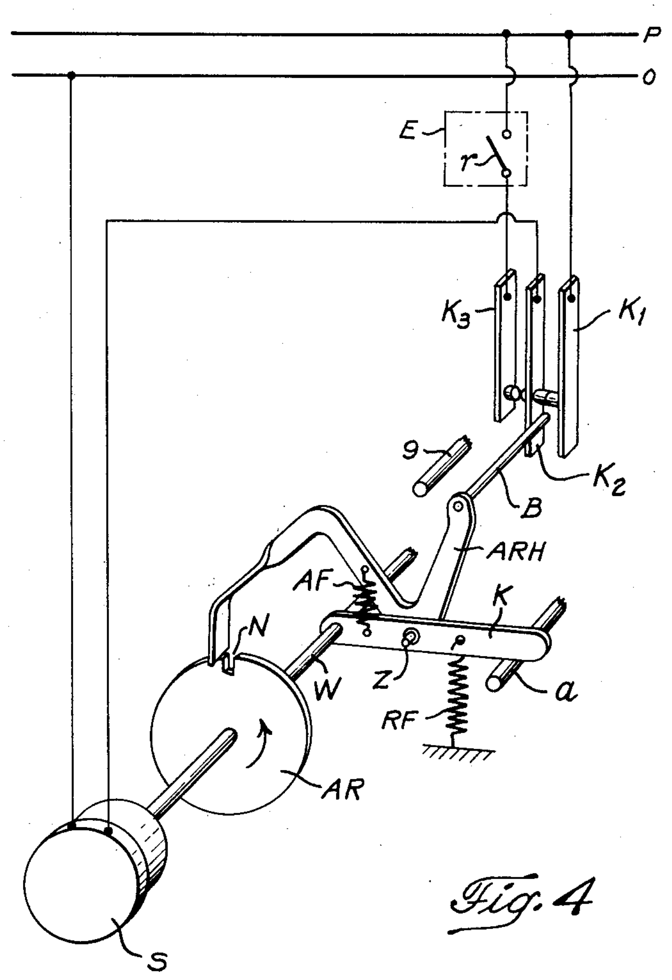
Figure 4 is a perspective and schematic view showing apparatus of the invention in combination with a simplified synchronous selector arrangement.

Figure 4 shows a further constructional example of the subject of the invention, which operates in accordance with exactly the same principle as the arrangement according to Figure 3. The manner in which it cooperates with the synchronous motor of the synchronous selector will be explained later. The retaining and resetting lever member ARH is shown in Figure 4 in a position which it occupies shortly before the end of a rotation of the synchronous selector, i.e. shortly before the engagement in the slot N. A pair of contacts $K_1$, $K_2$ is closed by means of a pin B turned back towards the right. This position corresponds to that during the entire self-maintained rotation of the synchronous motor S. On engagement of the retaining and resetting lever member ARH in the slot N, the spring $K_2$ is turned somewhat to the left, so that the pair of contacts $K_1$, $K_2$ opens and thus stops the motor. A pair of contacts $K_2$, $K_3$ is then closed and the presence of operating voltage at the motor S is made dependent upon the functioning of a contact *r* of a selective input circuit E, which is not fully illustrated. On application to the network PO of brief impulses capable of closing the contact *r*, the synchronous selector tends to rotate somewhat in the counter-clockwise direction. If these impulses are not sufficiently long, the synchronous selector turns back into the zero position in the described manner. Only on arrival of impulses which reach the required length of the starter impulse is the deflection so great that the retaining and resetting lever member ARH is lifted from the slot N. The pair of contacts $K_2$, $K_3$ thus opens while the pair of contacts $K_1$, $K_2$ closes again and applies self-maintained voltage to the motor S for a complete revolution.

The described arrangement has not only the advantage that it renders difficult the starting of a remote control receiver under the action of brief interference impulses or of order impulses which are shorter than the starter impulse, but in addition it permits, by reason of the precision of the zero position of the synchronous selector, a more precise relative positioning of the impulse patterns of the receivers employed, often in larger numbers, in the networks.

Since the accuracy of the impulse pattern must satisfy certain tolerance requirements in regard to the synchronous positioning of the receivers in relation to the transmitted impulse pattern in order to ensure correct operation of large numbers of receivers, the arrangement according to the present invention also considerably facilitates the mass production of the receiving equipment.

The invention in its broader aspects is not limited to the specific mechanisms shown and described but departures may be made therefrom within the scope of the accompanying claims without departing from the principles of the invention and without sacrificing its chief advantages.

What is claimed is:

1. In a remote control receiver for central remote control installations, utilizing audio-frequency signals superimposed on the mains network and operating in accordance with the synchronous selector principle wherein order impulses in timed relation with a starter impulse are processed by means of a synchronous selector having a shaft driven by a synchronous motor to actuate a contact arrangement lying in the circuit of the synchronous motor driving the said shaft after receiving a starter impulse, and at least one contact arrangement allocated to an order impulse, means for rendering said receiver immune to interference and for increasing the sensitivity of said receiver comprising a resetting device coupled to said synchronous selector to return the synchronous selector to a neutral position on deflection form this position by impulses which do not exceed a predetermined length shorter than the starter impulse, said resetting device comprising a resetting member acting on the synchronous shaft, and a resetting spring acting on said resetting member through a resetting lever member, and a retaining member acting on the synchronous shaft, and a retaining spring acting on said retaining member through a retaining lever member.

2. In a remote control receiver as claimed in claim 1, wherein the resetting member and the retaining member are combined to form a common retaining and resetting member, and the retaining lever member and the resetting lever member are combined to form a common retaining and resetting lever member, which latter common member is coupled with a coupling member freely rotatable with respect to a stop so that the retaining and resetting lever member may carry out both a rotational movement corresponding to the effective range of the resetting spring and a sliding movement corresponding to the effective range of the retaining spring.

3. Apparatus according to claim 2, wherein said common retaining and resetting member is slotted and said retaining and resetting lever member engages said slot when said synchronous shaft is in the zero position, a sliding surface means, said lever member being disengaged from said slot by means of said sliding surface on rotation of the synchronous shaft.

4. Apparatus according to claim 3, including a guide slot whereby the retaining and resetting lever member is translationally movable in relation to the coupling member by means of said guide slot.

5. Apparatus according to claim 3, including a guide pin whereby the retaining and resetting lever member is rotationally movable in relation to the coupling member by means of said pivot pin.

6. Apparatus according to claim 2, including coupling means whereby the retaining and resetting lever member and the coupling member actuate a contact of an associated auxiliary circuit.

References Cited in the file of this patent

UNITED STATES PATENTS

| | | |
|---|---|---|
| 1,771,135 | Mack | July 22, 1932 |
| 2,217,064 | McKenzie | Oct. 8, 1940 |